(12) United States Patent
Doira et al.

(10) Patent No.: US 7,943,883 B2
(45) Date of Patent: May 17, 2011

(54) METHOD FOR JOINING IRON MEMBER AND ALUMINUM MEMBER AND IRON-ALUMINUM JOINED BODY

(75) Inventors: Kazuyoshi Doira, Saitama (JP); Noboru Hayashi, Saitama (JP); Masaaki Fujimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 769 days.

(21) Appl. No.: 11/907,670

(22) Filed: Oct. 16, 2007

(65) Prior Publication Data
US 2008/0102308 A1    May 1, 2008

(30) Foreign Application Priority Data

Oct. 27, 2006   (JP) .................................. 2006-292444

(51) Int. Cl.
*B23K 11/20*  (2006.01)
(52) U.S. Cl. ... 219/118; 428/653; 428/659; 219/121.14; 219/121.64
(58) Field of Classification Search .................. None
See application file for complete search history.

(56) References Cited

U.S. PATENT DOCUMENTS

| | | | |
|---|---|---|---|
| 3,798,406 A * | 3/1974 | Becker ............................. | 219/92 |
| 4,113,167 A * | 9/1978 | Komiyama et al. ............ | 228/176 |
| 5,783,794 A * | 7/1998 | Oikawa et al. ................ | 219/118 |
| 7,329,828 B2 * | 2/2008 | Spriestersbach et al. ........................ | 219/121.46 |
| 2005/0218121 A1 | 10/2005 | Hayashi | |
| 2008/0026247 A1 * | 1/2008 | Nakagawa et al. ........... | 428/649 |
| 2008/0099183 A1 * | 5/2008 | Milnthorp ....................... | 165/77 |
| 2008/0178467 A1 * | 7/2008 | Hayashi et al. .............. | 29/897.2 |
| 2009/0011269 A1 * | 1/2009 | Urushihara et al. ........... | 428/594 |
| 2009/0050608 A1 * | 2/2009 | Hayashi et al. ........... | 219/121.14 |
| 2009/0307907 A1 * | 12/2009 | Carl et al. ................ | 29/890.046 |

FOREIGN PATENT DOCUMENTS

| | | | |
|---|---|---|---|
| DE | 3739300 C1 | * | 4/1989 |
| EP | 1806200 A1 | | 7/2007 |
| JP | 9-155561 A | | 6/1997 |
| JP | 2003-236673 A | | 8/2003 |
| JP | 2004-42053 A | | 2/2004 |
| JP | 2006-175502 | * | 7/2006 |
| JP | 2006-198679 | * | 8/2006 |
| JP | 2006-326613 | * | 12/2006 |
| JP | 2007-105737 | * | 4/2007 |
| JP | 2007-118059 | * | 5/2007 |
| JP | 2007-260777 | * | 10/2007 |

* cited by examiner

*Primary Examiner* — John J Zimmerman
(74) *Attorney, Agent, or Firm* — Arent Fox, LLP (57) ABSTRACT

There is provided a method for joining an iron member and an aluminum member, the iron member including a plated layer at least on a joining side with the aluminum member; the aluminum member formed of an aluminum cladding material including an aluminum core material mainly formed of aluminum and an aluminum alloy layer with a melting point lower than that of the aluminum core material, cladded on a joining side with the iron member; the method including a step of stacking the iron member and the aluminum member, and a step of joining the iron member and the aluminum member.

5 Claims, 11 Drawing Sheets

FIG. 5  ⟨Example 1, second joining portion, inner position⟩
Thickness 0.5 μm

34 intermetallic compound Fe-Al-Si

34 intermetallic compound Fe-Al-Si

METHOD FOR JOINING IRON MEMBER AND ALUMINUM MEMBER AND IRON-ALUMINUM JOINED BODY

CROSS-REFERENCE TO RELATED APPLICATIONS

This application claims the foreign priority benefit under Title 35, United States Code, section 119 (a)-(d), of Japanese Patent Application No. 2006-292444, filed on Oct. 27, 2006 in the Japan Patent Office, the disclosure of which is herein incorporated by reference in its entirety.

BACKGROUND OF THE INVENTION

1. Field of the Invention

The present invention relates to a method for joining an iron member and an aluminum member, and to an iron-aluminum joined body.

2. Description of the Related Art

In general, for a body of a vehicle, such as automobile, a steel sheet (iron member) has been used. Meanwhile, weight reduction of the vehicle body has been demanded from a viewpoint of reducing fuel consumption. Accordingly, there has been developed a hybrid body using a material in which a steel sheet and a light aluminum plate (aluminum member) are joined.

However, direct joining of the steel sheet and the aluminum plate is difficult, and thus a proposal has been made, for example, in which a steel sheet and an aluminum plate are joined through insertion materials disposed therebetween (see Japanese Patent Unexamined Publication JPH9-155561A (FIG. 3)). Another proposal includes a technique in which a zinc plated layer is cladded on a joining surface of a steel sheet, and the steel sheet and an aluminum plate are joined (see WO/2006/046608).

In such a joining of the steel sheet and the aluminum plate, there still are demands for developing a method that further enhances joining strength.

Therefore, it would be desirable to provide a method for excellently joining a steel sheet and an aluminum plate, and to provide a joined body in which a steel sheet and an aluminum plate are excellently joined.

SUMMARY OF THE INVENTION

In one aspect of the present invention, there is provided a method for joining an iron member and an aluminum member, the iron member including a plated layer at least on a joining side with the aluminum member; the aluminum member formed of an aluminum cladding material including an aluminum core material mainly formed of aluminum, and an aluminum alloy layer with a melting point lower than that of the aluminum core material, cladded on a joining side with the iron member; the method including a step of stacking the iron member and the aluminum member, and a step of joining the iron member and the aluminum member.

According to such a method for joining an iron member and an aluminum member, at a central portion of the joining where a temperature raise due to a heat input is large, a plated layer with a low melting point formed on the surface of the iron member is molten, and a newly-formed surface of the iron member is exposed to a nugget. In the aluminum member formed of the aluminum cladding material, both the aluminum core material and the aluminum alloy layer having a melting point lower than that of the core material are molten, and a strong oxide film formed on the surface of the aluminum member is broken. Then, at an interface between the iron member and the molten aluminum member, an intermetallic compound is formed, and a first joining portion which will be described below is formed.

On the other hand, at the surrounding portion around the central portion, where a temperature raise due to a heat input is small and thus the temperature is lower than the melting point of the aluminum core material, in the iron member, like in the central portion as described above, the plated layer with a low melting point is molten and a newly-formed surface of the iron member is exposed to a nugget. In the aluminum member formed of the aluminum cladding material, only the aluminum alloy layer having a melting point lower than that of the aluminum core material is molten, and a strong oxide film formed on the surface of the aluminum member is broken. Also in the surrounding portion around the first joining portion, between the iron member and the molten aluminum alloy layer, an intermetallic compound is formed, and a second joining portion which will be described below is formed.

According to such a method for joining an iron member and an aluminum member, due to the presence of the first joining portion and the second joining portion, the iron member and the aluminum member are suitably joined. In other words, in addition to the conventional first joining portion, the joining is made at the newly formed second joining portion, which gives larger joining area in total. As a result, in the iron-aluminum joined body obtained as such, joining strength, such as shearing strength and delamination strength, can be enhanced as compared with the conventional iron-aluminum joined body.

In the method described above, it may be preferable that the plated layer of the iron member has a melting point lower than that of the aluminum alloy layer of the aluminum member formed of the aluminum cladding material.

According to such a method for joining an iron member and an aluminum member, the plated layer on the surface of the iron member at the joining portion has a melting point lower than that of the aluminum alloy layer at the joining portion. Therefore, also in the surrounding portion at a lower temperature, the newly-formed surface of the iron member is exposed to a nugget, and can form a second joining portion with the molten aluminum alloy layer.

In the method described above, it may be preferable that a thickness of the aluminum alloy layer is 0.02 mm or more and 0.28 mm or less, and a ratio of the thickness of the aluminum alloy layer to an entire thickness of the aluminum member is 1.7% or more and 20% or less.

According to such a method for joining an iron member and an aluminum member, by setting the thickness of the aluminum alloy layer at 0.02 mm or more and 0.28 mm or less, and the ratio of the thickness of the aluminum alloy layer to the entire thickness of the aluminum member (clad ratio) at 1.7% or more and 20% or less, in the second joining portion, a period in which aluminum alloy layer is in a form of a liquid (in a molten state) is shortened, and growth of the Al—Fe containing intermetallic compound can be suppressed, to thereby enhance joining strength.

In the method described above, it would be preferable that the aluminum alloy layer is formed of any one of an Al—Si containing alloy and an Al—Cu containing alloy.

According to such a method for joining an iron member and an aluminum member, by selecting the Al—Si containing alloy or the Al—Cu containing alloy as a material for the aluminum alloy layer, a melting point of the aluminum alloy layer becomes lower than that of the aluminum core material, to thereby facilitate the formation of the second joining portion.

It would be also preferable that the welding is any one of resistance welding, MIG welding, laser welding, and electron beam welding.

In the method according to the present invention, an iron member and an aluminum member can be joined by welding, such as resistance welding (e.g. spot welding and projection welding), MIG (Metal Inert Gas) welding, laser welding, and electron beam welding.

In another aspect of the present invention, there is provided an iron-aluminum joined body formed by the method for joining an iron member and an aluminum member as described above, including a first joining portion where the iron member and the aluminum core material are joined, and a second joining portion surrounding the first joining portion, where the iron member and the aluminum alloy layer are joined.

According to this iron-aluminum joined body, the iron member and the aluminum member are joined together through the first joining portion and the second joining portion. With this structure, higher joining strength can be obtained as compared with the conventional techniques. Therefore, with an introduction of such an iron-aluminum joined body, for example, a hybrid body for an automobile can be suitably formed.

BRIEF DESCRIPTION OF THE DRAWINGS

The various aspects, other advantages and further features of the present invention will become more apparent by describing in detail illustrative, non-limiting embodiments thereof with reference to the accompanying drawings.

FIGS. 1A and 1B show cross-sectional views illustrating a method for joining a steel sheet and an aluminum plate according to the present embodiment, in which

DETAILED DESCRIPTION OF THE EXEMPLARY EMBODIMENTS

Next, an embodiment of the present invention will be described with reference to FIGS. 1 and 2.

<<Method for Joining Iron Member and Aluminum Member>>

Figure 1A:
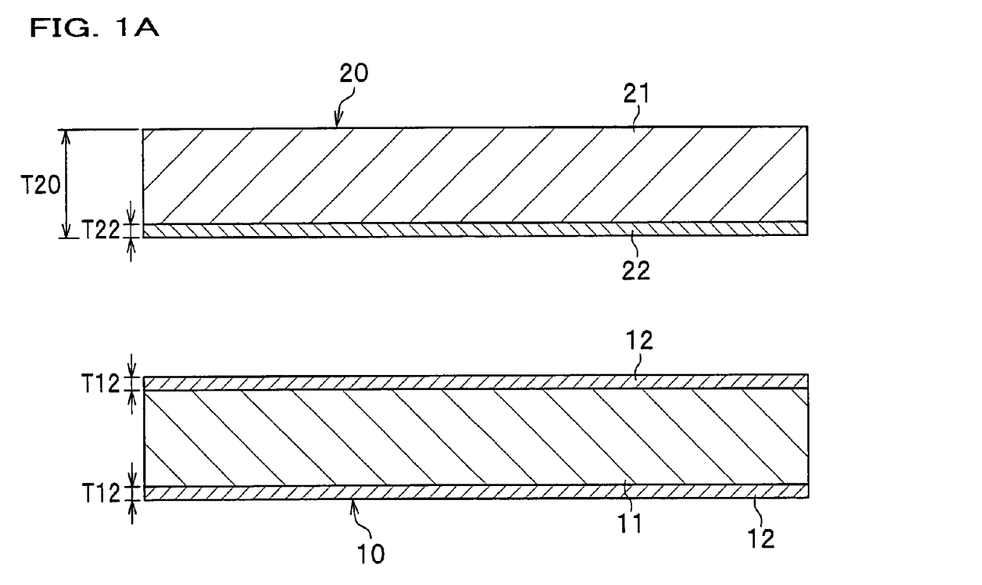
FIG. 1A shows a state before stacking the steel sheet and the aluminum plate.

As shown in FIG. 1A, in a method according to the present embodiment for joining a steel sheet 10 (iron member) and an aluminum-clad sheet 20 (aluminum member, aluminum cladding material), the steel sheet 10 includes a zinc plated layer 12 cladded on a joining face of the steel sheet 10, and the aluminum-clad sheet 20 includes an aluminum alloy layer 22 cladded on a joining face of the aluminum-clad sheet 20. The steel sheet 10 and the aluminum-clad sheet 20 are stacked and spot-welded (resistance-welded) while the zinc plated layer 12 and the aluminum alloy layer 22 face to each other.

<Steel Sheet>

In the present embodiment, the steel sheet 10 is a hot dip galvanized steel sheet including: a thin iron core material 11 mainly formed of iron; and a zinc plated layer 12 which is mainly formed of zinc and cladded on both sides (or on at least a joining side) of the iron core material 11. Such a steel sheet 10 including the iron core material 11 with the zinc plated layer 12 cladded thereon can be obtained by applying molten zinc to a surface of the iron core material 11. Alternatively, the steel sheet 10 including the iron core material 11 with zinc cladded thereon can be obtained by deposition utilizing electrolytic reaction, coating application, spraying or the like.

For the iron core material 11, any material can be used, including what is called a soft steel sheet and a high-tensile strength steel sheet.

[Zinc Plated Layer]

A zinc plated layer 12 is mainly formed of zinc (melting point: approximately 419.5° C.), and thus has a melting point lower than that of the aluminum alloy layer 22 formed of Al—Si or Al—Cu aluminum alloy. As a result, as will be described below, when spot-welded, even in a surrounding portion 52 where a temperature raise is small, the zinc plated layer 12 is molten and a newly-formed surface of the iron core material 11 is exposed to a nugget, to thereby form a second joining portion J2 at an interface with the aluminum-clad sheet 20.

A thickness T12 of the zinc plated layer 12 is, for example, preferably 3.0 μm or more and 45.0 μm or less, from viewpoints of formability, weldability and corrosion resistance of vehicle members, when a welded iron-aluminum joined body 30 (see FIG. 2) is used as a vehicle member. To put is another way, a coating weight of the zinc plated layer 12 on one side of the steel sheet 10 is preferably 20 g/m² or more and 300 g/m² or less.

<Aluminum-Clad Sheet>

The aluminum-clad sheet 20 includes: an aluminum core material 21 in a shape of a thin plate mainly formed of aluminum; and the aluminum alloy layer 22 having a melting point lower than that of the aluminum core material 21 which is cladded on at least a joining side of the aluminum core material 21. The aluminum-clad sheet 20 can be obtained by stacking the aluminum core material 21 and a cladding material to become the aluminum alloy layer 22, rolling and heating the stacked body. Alternatively, the aluminum-clad sheet 20 can be obtained by other various techniques. It should be noted that the aluminum core material 21 may be formed of aluminum or aluminum alloy, and examples include aluminum of 3,000 series (such as A3003 and A3004), 5,000 series (such as A5052, A5454, A5754 and A5182) and 6,000 series (such as A6016, A6022 and A6111).

[Aluminum Alloy Layer]

It is noted that the aluminum alloy layer 22 has a melting point lower than that of the aluminum core material 21 (melting point: approximately 660° C.). Such an aluminum alloy layer 22 with a lower melting point is, for example, formed of an Al—Si containing alloy (4000 series alloy, melting point: 577° C.), an Al—Cu containing alloy (melting point: 548° C.) or the like.

When the aluminum alloy layer 22 is formed of the Al—Si containing alloy, it is preferable that the amount of Si contained in the aluminum alloy layer 22 is 4.0% by mass or more and 11.6% by mass or less, since a eutectic point of Al and Si is obtained at 11.7% by mass of Si.

On the other hand, when the aluminum alloy layer 22 is formed of the Al—Cu containing alloy, it is preferable that the amount of Cu contained in the aluminum alloy layer 22 is 5.7% by mass or more and 33.2% by mass or less, since a eutectic point of Al and Cu is obtained at 33.2% by mass of Cu.

A thickness T22 of the aluminum alloy layer 22 is 0.02 mm or more and 0.28 mm or less. A clad ratio (T22/T20 (%)), which is defined as a ratio of the thickness T22 of the aluminum alloy layer 22 relative to the entire thickness T20 of the aluminum-clad sheet 20, is 1.7% or more and 20% or less. Accordingly, a growth of an intermetallic compound 34 which may otherwise be formed in a second joining portion J2 (which will be described below) can be suppressed.

<Stacking Sheets and Applying Current>

Figure 1B:
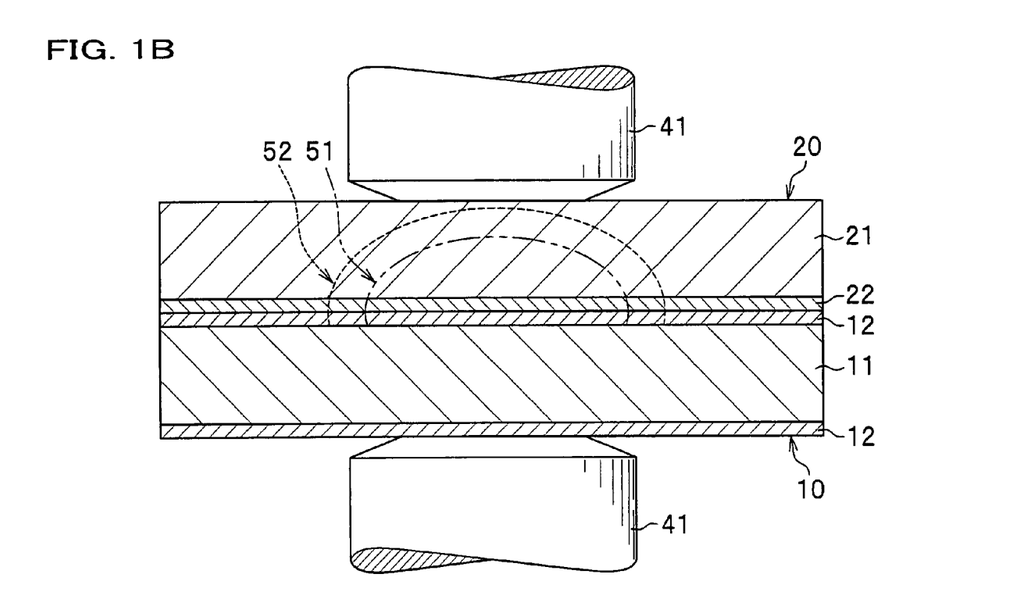
FIG. 1B shows a state during spot welding.

Next, as shown in FIG. 1B, the steel sheet 10 and the aluminum-clad sheet 20 are stacked while the zinc plated layer 12 and the aluminum alloy layer 22 are made opposed to each other. To the stacked body to be joined, a specific load is applied with a pair of electrodes 41, 41 for spot welding, and a specific current is applied for a specific time period from an external DC or AC power source.

It is noted that, when the steel sheet 10 and the aluminum-clad sheet 20 are stacked, a structural adhesive for preventing electric corrosion, a sealing agent for enhancing sealability or the like may be sandwiched therebetween.

By applying a current in the above-mentioned manner, in the stacked body in the vicinity of a central axis of the electrode 41, a central portion 51 is formed where a heat input by current application is large. Around the central portion 51, the surrounding portion 52 is formed where a heat input is smaller relative to that of the central portion 51.

Figure 2:
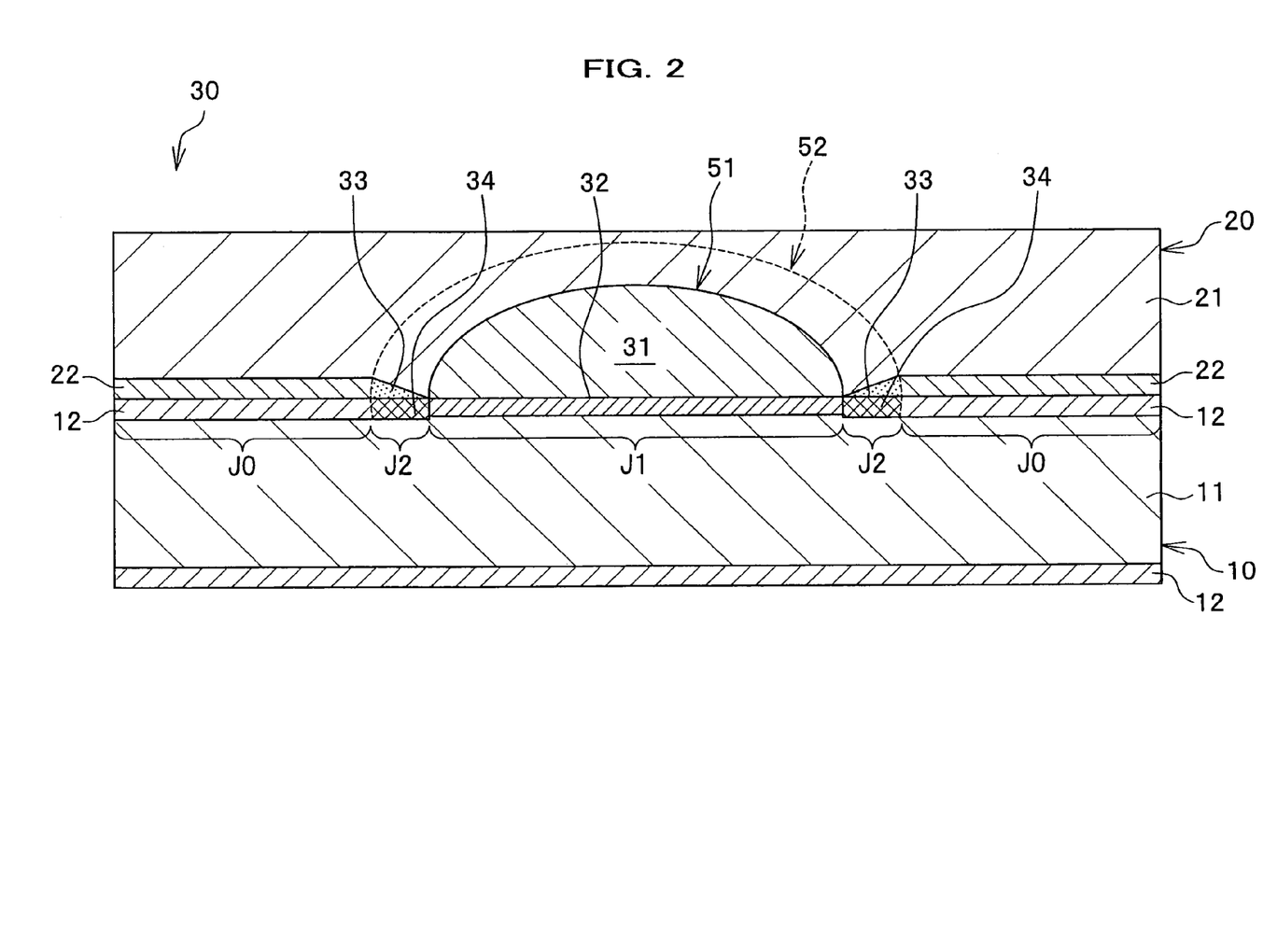
FIG. 2 shows an iron-aluminum joined body according to one embodiment.

Consequently in such a joining process, in the steel sheet 10 at the central portion 51 with a larger heat input, the zinc plated layer 12 is molten and the newly-formed surface of the iron core material 11 is exposed to a nugget, as shown in FIG. 2. At the same time, in the aluminum-clad sheet 20 at the central portion 51, a portion 31 is formed in which both the aluminum alloy layer 22 and the aluminum core material 21 are molten, and a strong oxide film on a surface of the aluminum-clad sheet 20 is broken.

Then, at the interface between the exposed newly-formed surface of the iron core material 11 and the molten portion 31 in the aluminum-clad sheet 20, a layered Fe—Al containing intermetallic compound 32 ($Fe_2Al_5$, $Fe_4Al_{13}$ or the like) is formed, as first joining portion J1 as shown in FIG. 2.

It should be noted that the molten portion 31 in the aluminum-clad sheet 20 of the central portion 51 contains a portion of the molten zinc plated layer 12 in a form of a solid solution.

In addition, in such a joining process, in the steel sheet 10 at the surrounding portion 52 with a smaller heat input, like in the case of the central portion 51, the zinc plated layer 12 on the surface is molten and the newly-formed surface of the iron core material 11 is exposed to a nugget. On the other hand, in the aluminum-clad sheet 20 at the surrounding portion 52, a portion 33 is formed in which solely the aluminum alloy layer 22 is molten, and the strong oxide film on the surface of the aluminum-clad sheet 20 is broken.

Then, at the interface between the exposed newly-formed surface of the iron core material 11 and the portion 33 where solely the aluminum alloy layer 22 in the aluminum-clad sheet 20 is molten, the granular Fe—Al containing intermetallic compound 34 ($Fe_4Al_{13}$ or the like) is formed, as the ring-shaped second joining portion J2, as shown in FIG. 2.

As described above, when the thickness of the aluminum alloy layer 22 is 0.02 mm or more and 0.28 mm or less, and at the same time the clad ratio is 1.7% or more and 20% or less, a melt time of the portion 33 in which solely the aluminum alloy layer 22 is molten can be reduced. Accordingly, the growth of the intermetallic compound 34 can be suppressed, which in turn enhances joining strength, especially in a direction of delamination.

It should be noted that the aluminum alloy layer 22 outside the surrounding portion 52 is not molten by welding heat, and thus the strong oxide film on the surface of the aluminum-clad sheet 20 is not broken. Therefore, no Fe—Al containing intermetallic compound is formed at the interface between the steel sheet 10 and the aluminum-clad sheet 20. In other words, the outer portion of the ring-shaped second joining portion J2 in a radial direction is non-joining portion J0 where no joining occurs.

<<Iron-Aluminum Joined Body>>

According to the iron-aluminum joined body 30 obtained by the method of the present embodiment for joining the steel sheet 10 and the aluminum-clad sheet 20, the steel sheet 10 and the aluminum-clad sheet 20 are joined through the first joining portion J1 and the second joining portion J2 which surrounds the first joining portion J1. Therefore, as compared with the conventional technique in which joining is made only at the first joining portion J1, higher joining strength can be obtained. Accordingly, the joining of this kind can be suitably applied to the hybrid body for a vehicle that suffers continuous vibrations and large impacts.

The embodiment of the present invention has been described above. However, the present invention is not limited to the above embodiment, and it is a matter of course that the above embodiment may be properly modified.

For example, in the embodiment above, the steel sheet 10 and the aluminum-clad sheet 20 are joined by one type of resistance welding, i.e., spot welding. However, seam welding or projection welding may be used as resistance welding.

The welding is not limited to the resistance welding, and other weldings, such as MIG welding, laser welding, electron beam welding and arc welding, may be used.

In the embodiments described above, the aluminum-clad sheet 20 has the aluminum alloy layer 22 cladded on only one side thereof. However, the aluminum-clad sheet 20 may have the aluminum alloy layer 22 cladded on both sides thereof.

In the embodiments described above, the aluminum-clad sheet 20 has a single-layered aluminum alloy layer 22. However, the aluminum-clad sheet 20 may have a multi-layered aluminum alloy layer 22.

EXAMPLES

With reference to Examples, the present invention will be described in further detail.

(1) Presence/Absence of Aluminum Alloy Layer 22

Examples 1-4, Comparative Examples 1-4

First, the effects of the aluminum alloy layer 22 were examined.

Referring to Table 1, in each of Examples 1-4, a steel sheet 10 with a zinc plated layer 12 and an aluminum-clad sheet 20 with an aluminum alloy layer 22 were spot-welded together to obtain an iron-aluminum joined body 30. Also referring to Table 1, in each of Comparative Examples 1-4, a steel sheet 10 with a zinc plated layer 12 and an aluminum plate without an aluminum alloy layer 22 were spot-welded together to obtain an iron-aluminum joined body 30. Types of the steel sheet 10, specifications of the aluminum-clad sheet 20 and welding conditions are shown in Table 1.

The thickness T22 of the aluminum alloy layer 22 was set at 0.12 mm, and the clad ratio was set at 10%.

TABLE 1

|  | Ex1 | Ex2 | Ex3 | Ex4 | CEx1 | CEx2 | CEx3 | CEx4 |
|---|---|---|---|---|---|---|---|---|
| Object to be welded | | | | | | | | |
| Steel sheet | | | | | | | | |
| Type of steel sheet | a | a | b | c | a | a | b | c |
| Type of steel | d | e | e | f | d | e | e | f |
| Entire thickness (mm) | 1.6 | 1.6 | 1.6 | 1.6 | 1.6 | 1.6 | 1.6 | 1.6 |
| Zn plated layer | | | | | | | | |
| Thickness (μm) | 10 | 15 | 2.8 | 10 | 10 | 15 | 2.8 | 10 |
| Coating weight (g/m$^2$) | 60 | 90 | 20 | — | 60 | 90 | 20 | — |
| Melting point (° C.) | 419 | 419 | 419 | 388 | 419 | 419 | 419 | 388 |
| Zn plated layer component ratio | | | | | | | | |
| Zn (% by mass) | 99.5 | 99.5 | 100 | 85.8 | 99.5 | 99.5 | 100 | 85.8 |
| Al (% by mass) | 0.5 | 0.5 | — | 11 | 0.5 | 0.5 | — | 11 |
| Mg (% by mass) | — | — | — | 3 | — | — | — | 3 |
| Fe (% by mass) | — | — | — | — | — | — | — | — |
| Aluminum plate | | | | | | | | |
| Entire thickness (mm) | 1.2 | 1.2 | 1.2 | 1.2 | 1.2 | 1.2 | 1.2 | 1.2 |
| Aluminum core material | | | | | | | | |
| Core material thickness (mm) | 1.08 | 1.08 | 1.08 | 1.08 | 1.08 | 1.08 | 1.08 | 1.08 |
| Type of alloy | A6022 | A6022 | A6022 | A6022 | A6022 | A6022 | A6022 | A6022 |
| Mg content (% by mass) | 0.5 | 0.5 | 0.5 | 0.5 | 0.5 | 0.5 | 0.5 | 0.5 |
| Si content (% by mass) | 1.0 | 1.0 | 1.0 | 1.0 | 1.0 | 1.0 | 1.0 | 1.0 |
| Mn content (% by mass) | — | — | — | — | — | — | — | — |
| Aluminum alloy layer (Al—Si alloy) | | | | | | | | |
| Thickness (mm) | 0.12 | 0.12 | 0.12 | 0.12 | 0 | 0 | 0 | 0 |
| Si content (% by mass) | 11 | 11 | 11 | 11 | 0 | 0 | 0 | 0 |
| Clad ratio (%) | 10.0 | 10.0 | 10.0 | 10.0 | 0.0 | 0.0 | 0.0 | 0.0 |
| Melting point (° C.) | 577 | 577 | 577 | 577 | — | — | — | — |
| Welding conditions | | | | | | | | |
| Electrode diameter (mm) | 6 | 6 | 6 | 6 | 6 | 6 | 6 | 6 |
| Pinching force of electrode (kN(kgf)) | 1.47 (150) | 1.47 (150) | 1.47 (150) | 1.47 (150) | 1.47 (150) | 1.47 (150) | 1.47 (150) | 1.47 (150) |
| Current (kA) | 12 | 12 | 12 | 12 | 12 | 12 | 12 | 12 |
| Current application cycle | 20 | 20 | 20 | 20 | 20 | 20 | 20 | 20 |
| Evaluation after welding | | | | | | | | |
| Shearing joining strength (kN(kgf)) | 5.05 (516) | 4.98 (508) | 4.56 (465) | 4.65 (474) | 4.76 (486) | 4.66 (476) | 4.45 (454) | 4.23 (432) |
| Delamination joining strength (kN(kg)) | 1.97 (201) | 1.75 (179) | 1.81 (185) | 1.36 (139) | 1.46 (149) | 1.44 (147) | 1.54 (157) | 1.23 (126) | a: Hot dip galvanized steel sheet (GI steel sheet)
b: Electrogalvanized steel sheet (EG steel sheet)
c: Zn—Al—Mg plated steel sheet
d: 590 MPa grade steel sheet
e: 270 MPa grade steel sheet
f: Soft steel sheet Subsequently, with respect to each of the obtained iron-aluminum joined bodies 30, shearing joining strength (in accordance with JISZ3136) and delamination joining strength (in accordance with JISZ3137) were measured. The results are shown in Table 1 and FIG. 3.

In the drawings, an indication "Ex. 1" means a result obtained in Example 1, for instance. Likewise, an indication "CEx. 1" means a result obtained in Comparative Example 1. A similar indication has the same meaning.

Figure 3:
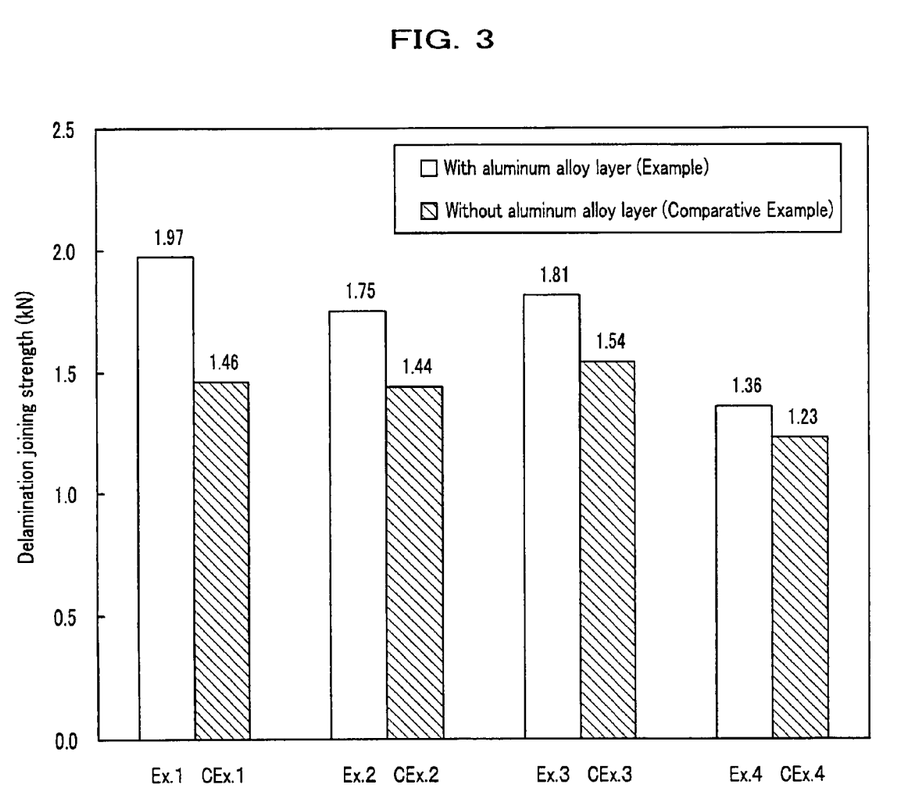
FIG. 3 is a graph showing a relationship between presence/absence of aluminum alloy layer and delamination joining strength.

As shown in Table 1 and FIG. 3, shearing joining strength and delamination joining strength, obtained in Examples 1-4 in which two members were joined through the aluminum alloy layer 22, are larger than those obtained in Comparative Examples 1-4 in which no aluminum alloy layer 22 is present. Accordingly, it is confirmed that joining strength increases by forming the aluminum alloy layer 22 on the joining side of the aluminum core material 21 and joining the steel sheet 10 and the aluminum-clad sheet 20 together with the aluminum alloy layer 22 and the zinc plated layer 12 facing to each other.

Figure 4:
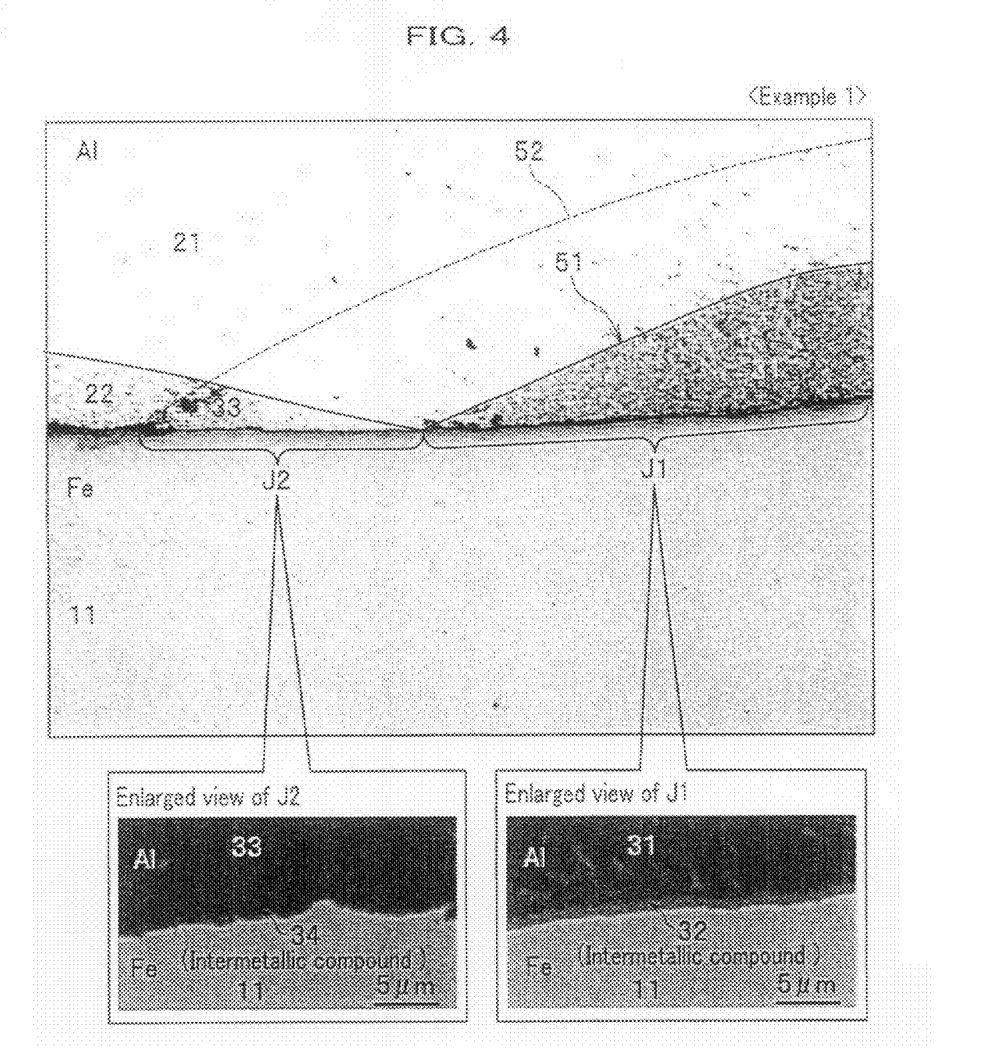
FIG. 4 is a transmission electron microscope (TEM) image of a cross section of a joining portion according to Example 1.
Figure 5:
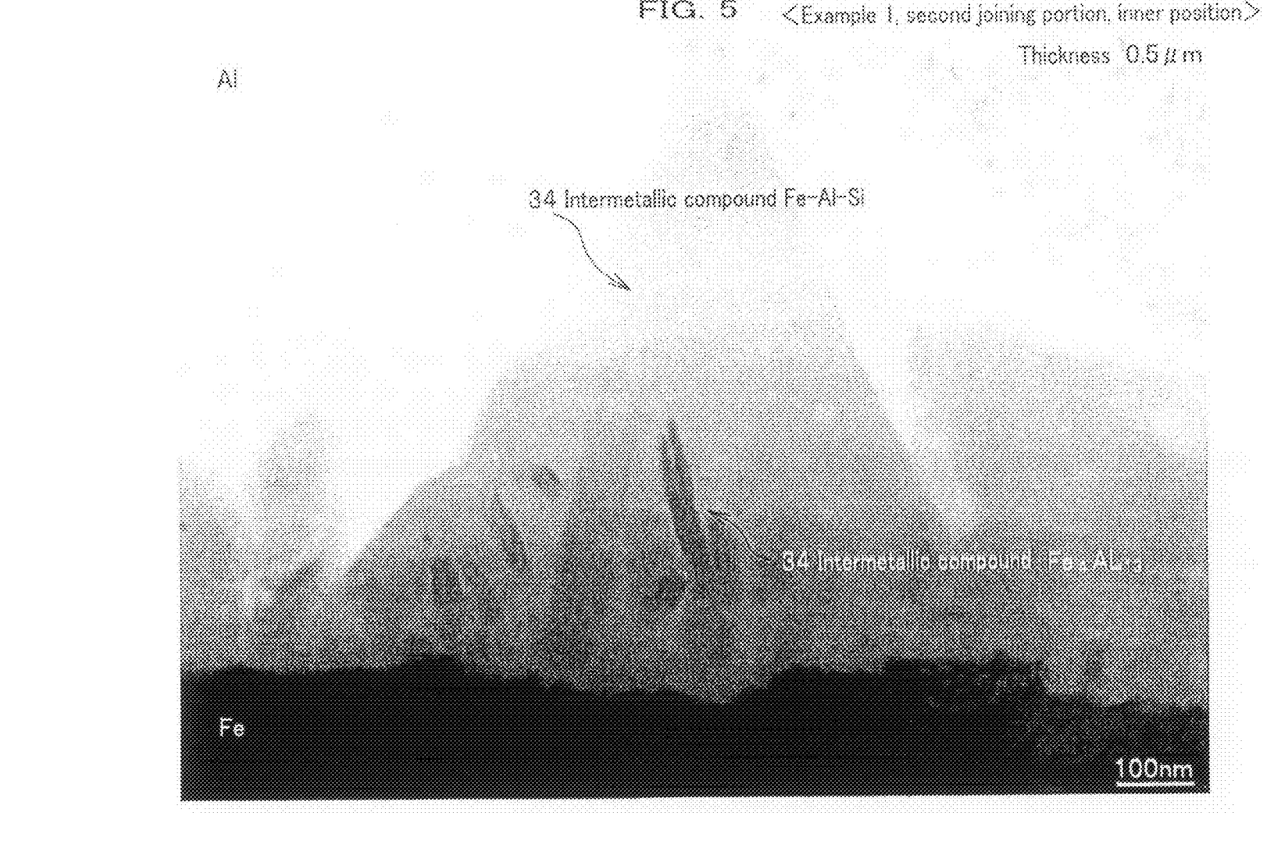
FIG. 5 is a transmission electron microscope (TEM) image of an inner position in a radial direction of a second joining portion according to Example 1.
Figure 6:
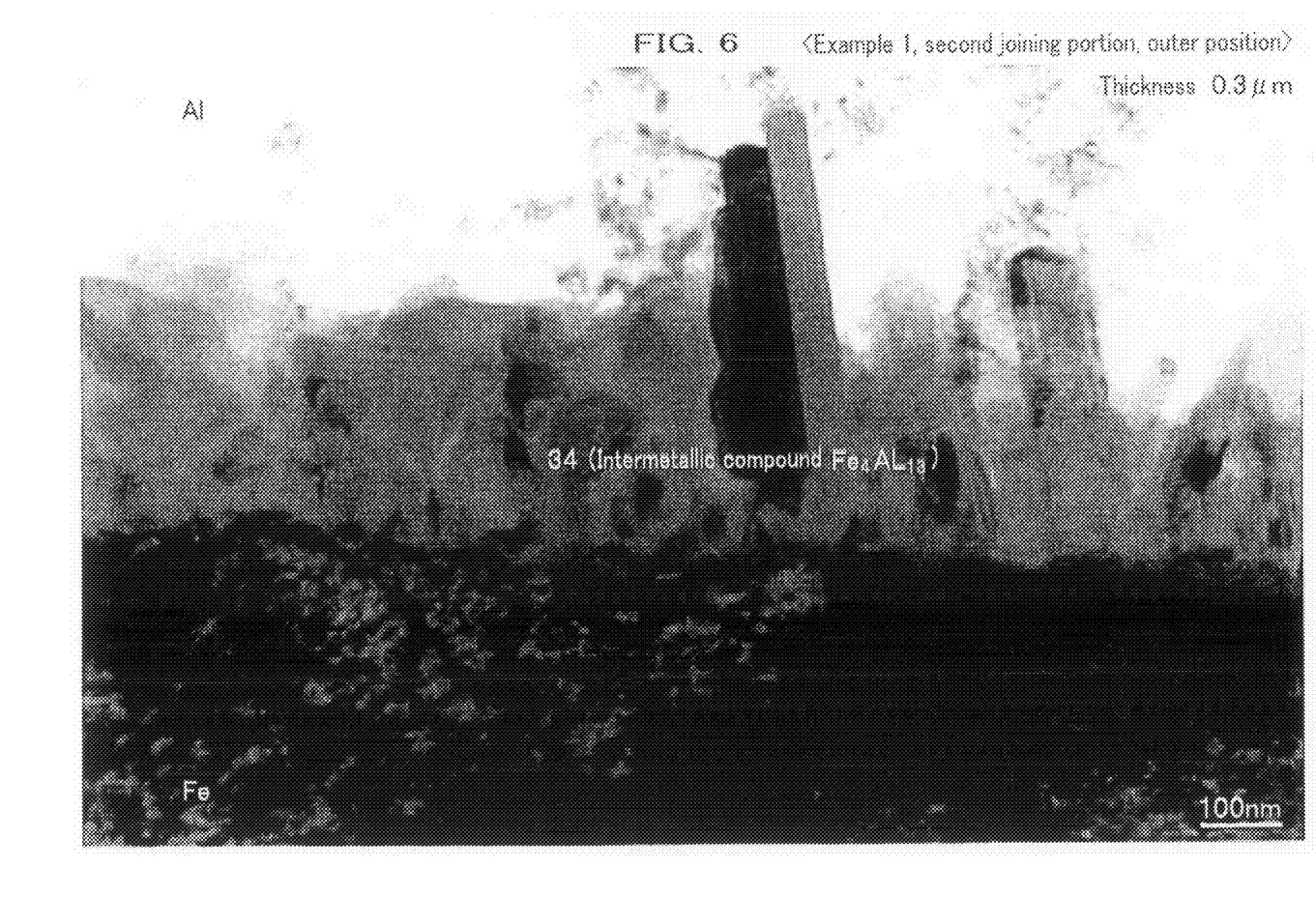
FIG. 6 is a transmission electron microscope (TEM) image of an outer position in a radial direction of a second joining portion according to Example 1.
Figure 7:
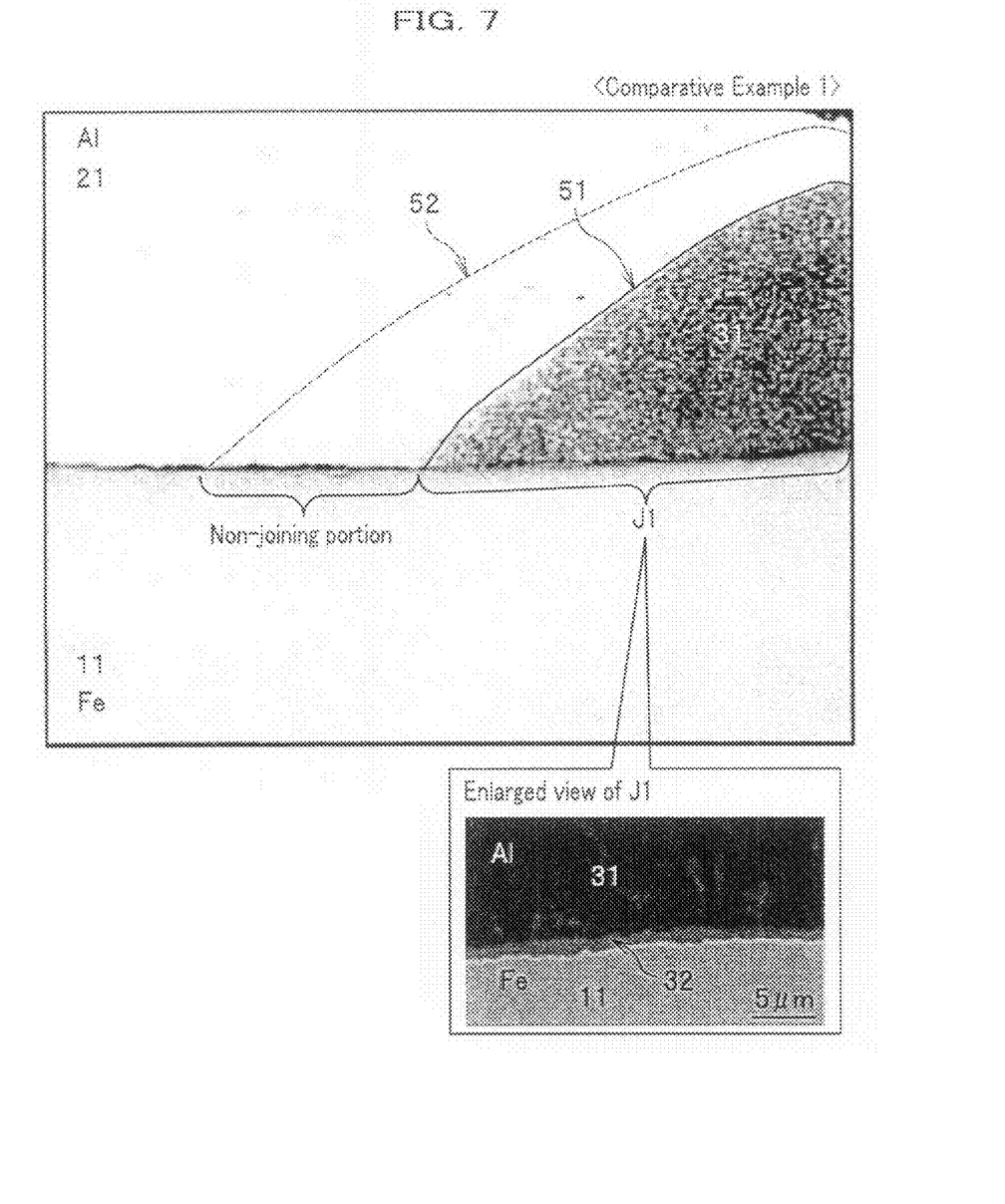
FIG. 7 is a transmission electron microscope (TEM) image of a cross section of a joining portion according to Comparative Example 1.
Figure 8:
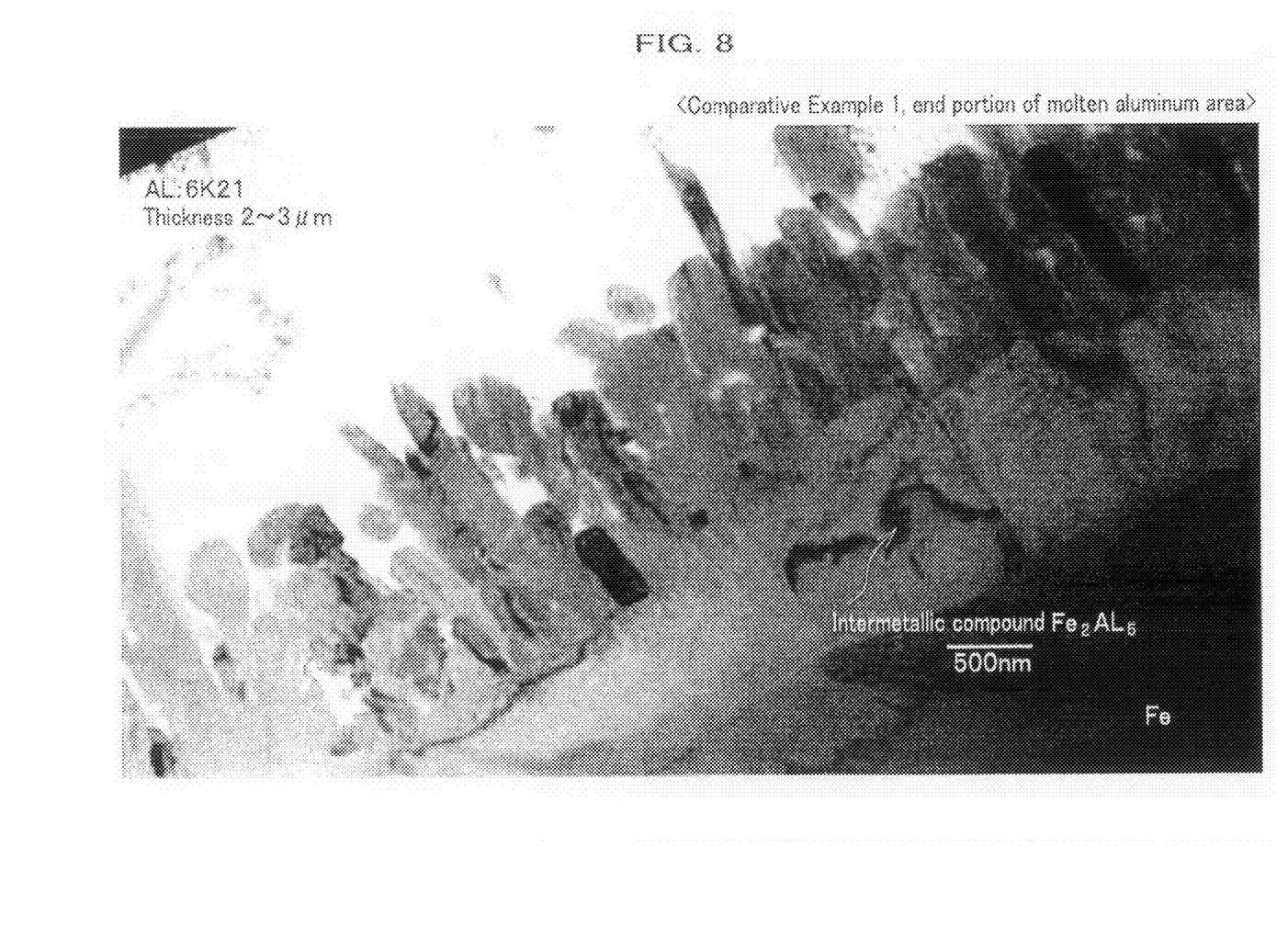
FIG. 8 is a transmission electron microscope (TEM) image of an end portion of a molten aluminum area according to Comparative Example 1.

In addition, a cross section of the joint portion of the iron-aluminum joined body 30 of Example 1 was observed with a transmission electron microscope (TEM). As a result, as shown in FIGS. 4-6, it was confirmed that in the second joining portion J2 of the surrounding portion 52, joining was completed while a size of the Fe—Al intermetallic compound (IMC) of iron and aluminum is suppressed to approximately 1/10 of that of Comparative Example 1 (see FIGS. 7 and 8). This is believed to be a reason for enhanced joining strength (especially joining strength in a delamination direction).

(2) Thickness and Clad Ratio of Aluminum Alloy Layer 22

Examples 1, 5-10, Comparative Examples 1 and 5

Next, the thickness and clad ratio of the aluminum alloy layer 22 were examined.

In each of Examples 1, 5-10 and Comparative Examples 1 and 5, a steel sheet 10 and an aluminum-clad sheet 20 having specifications shown in Table 2 were joined, to thereby form an iron-aluminum joined body 30. Subsequently, with respect to the iron-aluminum joined body 30, shearing joining strength and delamination joining strength were measured. The results are shown in Table 2 and FIGS. 9 and 10.

TABLE 2

|  | Ex5 | Ex6 | Ex7 | Ex8 | Ex1 | Ex9 | Ex10 | CEx1 | CEx5 |
|---|---|---|---|---|---|---|---|---|---|
| Object to be welded |  |  |  |  |  |  |  |  |  |
| Steel sheet |  |  |  |  |  |  |  |  |  |
| Type of steel sheet | a | a | a | a | a | a | a | a | a |
| Type of steel | d | d | d | d | d | d | d | d | d |
| Entire thickness (mm) | 1.6 | 1.6 | 1.6 | 1.6 | 1.6 | 1.6 | 1.6 | 1.6 | 1.6 |
| Zn plated layer |  |  |  |  |  |  |  |  |  |
| Thickness (μm) | 10 | 10 | 10 | 10 | 10 | 10 | 10 | 10 | 10 |
| Coating weight (g/m$^2$) | 60 | 60 | 60 | 60 | 60 | 60 | 60 | 60 | 60 |
| Melting point (° C.) | 419 | 419 | 419 | 419 | 419 | 419 | 419 | 419 | 419 |
| Zn plated layer component ratio |  |  |  |  |  |  |  |  |  |
| Zn (% by mass) | 99.5 | 99.5 | 99.5 | 99.5 | 99.5 | 99.5 | 99.5 | 99.5 | 99.5 |
| Al (% by mass) | 0.5 | 0.5 | 0.5 | 0.5 | 0.5 | 0.5 | 0.5 | 0.5 | 0.5 |
| Mg (% by mass) | — | — | — | — | — | — | — | — | — |
| Fe (% by mass) | — | — | — | — | — | — | — | — | — |
| Aluminum plate |  |  |  |  |  |  |  |  |  |
| Entire thickness (mm) | 1.2 | 1.2 | 1.2 | 1.2 | 1.2 | 1.2 | 1.2 | 1.2 | 1.2 |
| Aluminum core material |  |  |  |  |  |  |  |  |  |
| Core material thickness (mm) | 1.14 | 1.08 | 1.02 | 1.18 | 1.08 | 1.02 | 1.06 | 1.2 | 0.9 |
| Type of alloy | A6022 | A6022 | A6022 | A6022 | A6022 | A6022 | A6022 | A6022 | A6022 |
| Mg content (% by mass) | 0.5 | 0.5 | 0.5 | 0.5 | 0.5 | 0.5 | 0.5 | 0.5 | 0.5 |
| Si content (% by mass) | 1.0 | 1.0 | 1.0 | 1.0 | 1.0 | 1.0 | 1.0 | 1.0 | 1.0 |
| Mn content (% by mass) | — | — | — | — | — | — | — | — | — |
| Aluminum alloy layer (Al—Si alloy) |  |  |  |  |  |  |  |  |  |
| Thickness (mm) | 0.06 | 0.12 | 0.18 | 0.02 | 0.12 | 0.18 | 0.14 | 0 | 0.30 |
| Si content (% by mass) | 7 | 7 | 7 | 11 | 11 | 11 | 11 | 0 | 11 |
| Clad ratio (%) | 5.0 | 10.0 | 15.0 | 1.7 | 10.0 | 15.0 | 11.7 | 0.0 | 25.0 |
| Melting point (° C.) | 620 | 620 | 620 | 577 | 577 | 577 | 577 | — | 577 |
| Welding conditions |  |  |  |  |  |  |  |  |  |
| Electrode diameter (mm) | 6 | 6 | 6 | 6 | 6 | 6 | 6 | 6 | 6 |
| Pinching force of electrode (kN(kgf)) | 1.47 (150) | 1.47 (150) | 1.47 (150) | 1.47 (150) | 1.47 (150) | 1.47 (150) | 1.47 (150) | 1.47 (150) | 1.47 (150) |
| Current (kA) | 12 | 12 | 12 | 12 | 12 | 12 | 12 | 12 | 12 |
| Current application cycle | 20 | 20 | 20 | 20 | 20 | 20 | 20 | 20 | 20 |
| Evaluation after welding |  |  |  |  |  |  |  |  |  |
| Shearing joining strength (kN(kgf)) | 5.24 (535) | 5.04 (514) | 5.21 (532) | 4.73 (483) | 5.05 (516) | 4.03 (411) | 5.79 (591) | 4.76 (486) | 4.66 (476) |
| Delamination joining strength (kN(kg)) | 1.57 (148) | 1.72 (176) | 1.65 (168) | 1.81 (184) | 1.97 (201) | 1.53 (156) | 1.97 (201) | 1.46 (149) | 1.33 (136) | a: Hot dip galvanized steel sheet (GI steel sheet)
d: 590 MPa grade steel sheet

Figure 9:
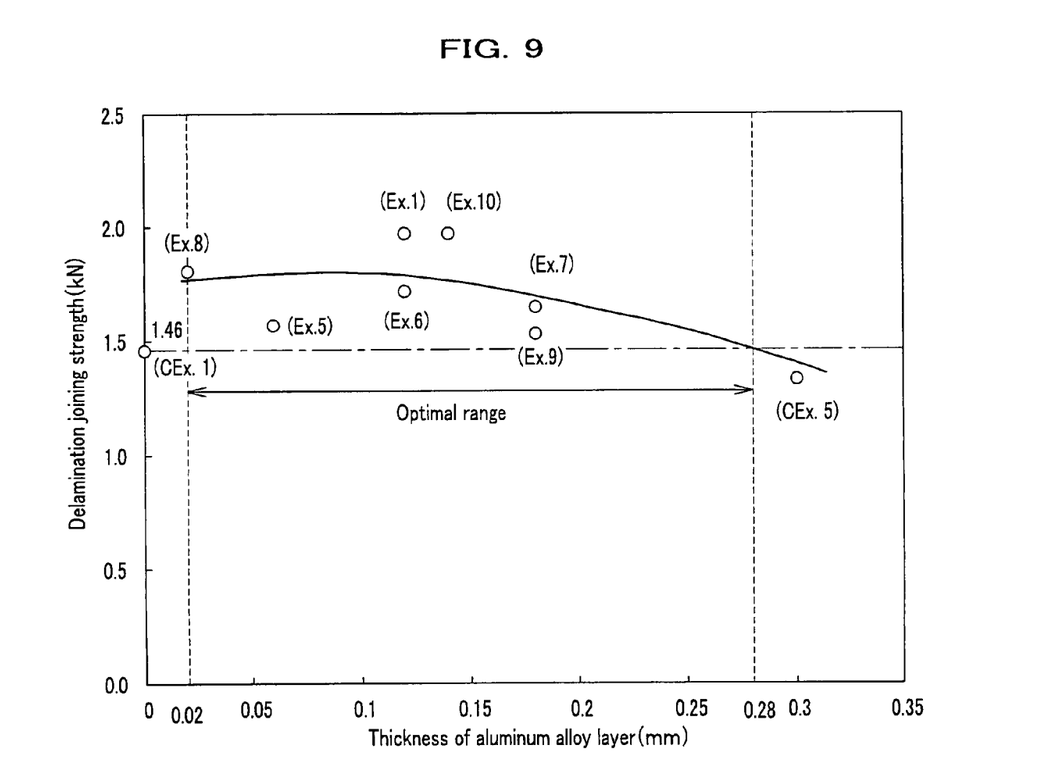
FIG. 9 is a graph showing a relationship between thickness of aluminum alloy layer and delamination joining strength.
Figure 10:
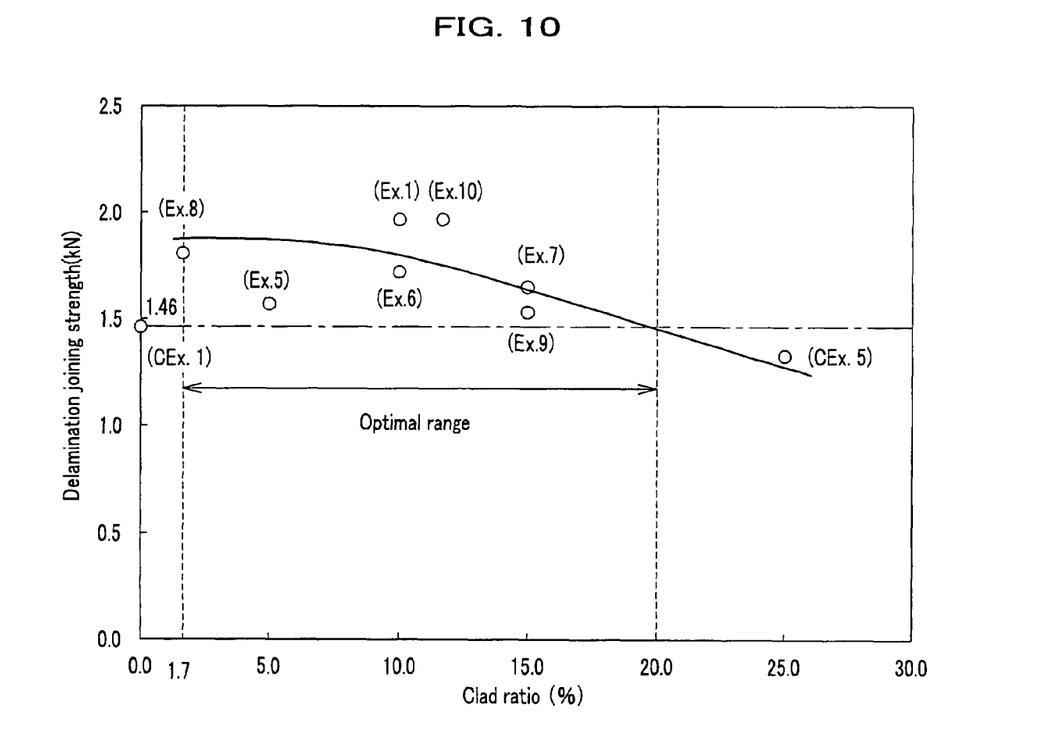
FIG. 10 is a graph showing a relationship between clad ratio and delamination joining strength.

As is apparent from FIGS. 9 and 10, in each of Examples 1, 5-10 where the thickness T22 of the aluminum alloy layer 22 is 0.02 mm or more and 0.28 mm or less and the clad ratio is 1.7% or more and 20% or less, it was confirmed that the delamination joining strength became larger than that in Comparative Example 1 (1.46 kN) where the steel sheet 10 and the aluminum-clad sheet 20 without the aluminum alloy layer 22 were joined.

(3) Amount of Si Contained in Aluminum Alloy Layer 22

Examples 1, 2 and 6 and Comparative Examples 1 and 6

Next, the amount of Si contained in the aluminum alloy layer 22 was examined.

Figure 11:
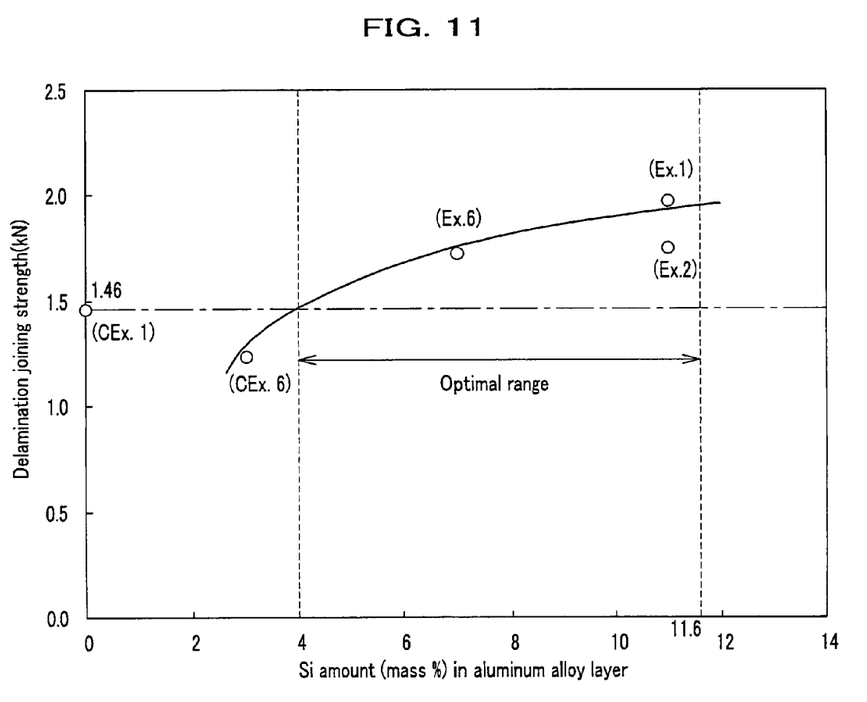
FIG. 11 is a graph showing a relationship between amount of Si in aluminum alloy layer and delamination joining strength.

In each of Examples 1, 2 and 6 and Comparative Examples 1 and 6, a steel sheet 10 and an aluminum-clad sheet 20 having specifications shown in Table 3 were joined, to thereby form an iron-aluminum joined body 30. Subsequently, with respect to the iron-aluminum joined body 30, shearing joining strength and delamination joining strength were measured. The results are shown in Table 3 and FIG. 11.

TABLE 3

|  | Ex6 | Ex1 | Ex2 | CEx1 | CEx6 |
|---|---|---|---|---|---|
| Object to be welded | | | | | |
| Steel sheet | | | | | |
| Type of steel sheet | a | a | a | a | a |
| Type of steel | d | d | e | d | d |
| Entire thickness (mm) | 1.6 | 1.6 | 1.6 | 1.6 | 1.6 |
| Zn plated layer | | | | | |
| Thickness (μm) | 10 | 10 | 15 | 10 | 10 |
| Coating weight (g/m$^2$) | 60 | 60 | 90 | 60 | 60 |
| Melting point (° C.) | 419 | 419 | 419 | 419 | 419 |
| Zn plated layer component ratio | | | | | |
| Zn (% by mass) | 99.5 | 99.5 | 99.5 | 99.5 | 99.5 |
| Al (% by mass) | 0.5 | 0.5 | 0.5 | 0.5 | 0.5 |
| Mg (% by mass) | — | — | — | — | — |
| Fe (% by mass) | — | — | — | — | — |
| Aluminum plate | | | | | |
| Entire thickness (mm) | 1.2 | 1.2 | 1.2 | 1.2 | 1.2 |
| Aluminum core material | | | | | |
| Core material thickness (mm) | 1.08 | 1.08 | 1.08 | 1.08 | 1.08 |
| Type of alloy | A6022 | A6022 | A6022 | A6022 | A6022 |
| Mg content (% by mass) | 0.5 | 0.5 | 0.5 | 0.5 | 0.5 |
| Si content (% by mass) | 1.0 | 1.0 | 1.0 | 1.0 | 1.0 |
| Mn content (% by mass) | — | — | — | — | — |
| Aluminum alloy layer (Al—Si alloy) | | | | | |
| Thickness (mm) | 0.12 | 0.12 | 0.12 | 0 | 0.12 |
| Si content (% by mass) | 7 | 11 | 11 | 0 | 3 |
| Clad ratio (%) | 10.0 | 10.0 | 10.0 | 0.0 | 10.0 |
| Melting point (° C.) | 620 | 577 | 577 | — | 640 |
| Welding conditions | | | | | |
| Electrode diameter (mm) | 6 | 6 | 6 | 6 | 6 |
| Pinching force of electrode (kN(kgf)) | 1.47 (150) | 1.47 (150) | 1.47 (150) | 1.47 (150) | 1.47 (150) |
| Current (kA) | 12 | 12 | 12 | 12 | 12 |
| Current application cycle | 20 | 20 | 20 | 20 | 20 |
| Evaluation after welding | | | | | |
| Shearing joining strength (kN(kgf)) | 5.04 (514) | 5.05 (516) | 4.98 (508) | 4.76 (486) | 5.18 (526) |
| Delamination joining strength (kN(kg)) | 1.72 (176) | 1.97 (201) | 1.75 (179) | 1.46 (149) | 1.23 (126) | a: Hot dip galvanized steel sheet (GI steel sheet)
d: 590 MPa grade steel sheet
e: 270 MPa grade steel sheet As is apparent from FIG. 11, in each of Examples 1, 2 and 6 where the amount of the Si contained in the aluminum alloy layer 22 is 4.0% by mass or more and 11.6% by mass or less, it was confirmed that the delamination joining strength became larger than that in Comparative Example 1 (1.46 kN) where the steel sheet 10 and the aluminum-clad sheet 20 without the aluminum alloy layer 22 were joined.

What is claimed is:

1. A method for joining an iron member and an aluminum member,
   the iron member comprising a plated layer at least on a joining side with the aluminum member;
   the aluminum member formed of an aluminum cladding material comprising an aluminum core material mainly formed of aluminum; and a cladded aluminum alloy layer with a melting point lower than that of the aluminum core material, on a joining side with the iron member;

the method comprising a step of stacking the iron member and the aluminum member, and a step of joining the iron member and the aluminum member wherein the cladded aluminum alloy layer is joined with the plated layer;

wherein the cladded aluminum alloy layer comprises any one of an Al—Si containing alloy and an Al—Cu containing alloy; and wherein the step of joining comprises welding.

2. The method according to claim 1, wherein the plated layer has a melting point lower than that of the aluminum alloy layer.

3. The method according to claim 1, wherein a thickness of the aluminum alloy layer is 0.02 mm or more and 0.28 mm or less, and a ratio of the thickness of the aluminum alloy layer to an entire thickness of the aluminum member is 1.7% or more and 20% or less.

4. The method according to claim 1, wherein the welding is any one of resistance welding, MIG welding, laser welding, and electron beam welding.

5. An iron-aluminum joined body formed by the method for joining an iron member and an aluminum member according to claim 1, comprising a first joining portion where the iron member and the aluminum core material are joined and a second joining portion surrounding the first joining portion, where the iron member and the aluminum alloy layer are joined.

* * * * *